(12) United States Patent
Gandelli et al.

(10) Patent No.: US 12,054,940 B2
(45) Date of Patent: Aug. 6, 2024

(54) CONSTRUCTION DAMPER WITH AT LEAST ONE AT LEAST IN REGIONS LADDER-LIKE CONSTRUCTED THRUST DAMPING PART

(71) Applicant: MAURER ENGINEERING GMBH, Munich (DE)

(72) Inventors: Emanuele Gandelli, Munich (DE); Johann Distl, Munich (DE)

(73) Assignee: Maurer Engineering GmbH, Munich (DE)

( * ) Notice: Subject to any disclaimer, the term of this patent is extended or adjusted under 35 U.S.C. 154(b) by 376 days.

(21) Appl. No.: 17/424,829

(22) PCT Filed: Feb. 7, 2020

(86) PCT No.: PCT/EP2020/053123
§ 371 (c)(1),
(2) Date: Jul. 21, 2021

(87) PCT Pub. No.: WO2020/161298
PCT Pub. Date: Aug. 13, 2020

(65) Prior Publication Data
US 2022/0136237 A1   May 5, 2022

(30) Foreign Application Priority Data
Feb. 8, 2019   (DE) ..................... 10 2019 201 682.0

(51) Int. Cl.
| F16F 7/12 | (2006.01) |
| E04B 1/98 | (2006.01) |
| E04H 9/02 | (2006.01) |
| F16F 7/00 | (2006.01) |

(52) U.S. Cl.
CPC ............. *E04B 1/98* (2013.01); *E04H 9/0237* (2020.05); *F16F 7/003* (2013.01); *F16F 7/12* (2013.01); *F16F 2224/0208* (2013.01); *F16F 2226/048* (2013.01)

(58) Field of Classification Search
CPC .......... E04B 1/98; E04H 9/0237; F16F 7/003; F16F 7/12; F16F 2224/0208; F16F 2226/048
USPC ....................... 52/167.1–167.9; 188/371–377
See application file for complete search history.

(56) References Cited

U.S. PATENT DOCUMENTS

| 4,272,114 A | 6/1981 | Hirano et al. | |
| 4,959,934 A * | 10/1990 | Yamada | ................ E04H 9/0237 |
| | | | 52/573.1 |
| 6,012,256 A * | 1/2000 | Aschheim | ............... E04C 3/086 |
| | | | 52/573.1 |

(Continued)

FOREIGN PATENT DOCUMENTS

| EP | 2 165 024 A1 | 3/2010 |
| JP | 2-217634 A | 8/1990 |

(Continued)

*Primary Examiner* — Christopher P Schwartz
(74) *Attorney, Agent, or Firm* — IceMiller LLP

(57) ABSTRACT

The present invention relates to a construction damper with at least one at least in regions ladder-like constructed thrust damping part which has a spatial structure wherein at least two transverse beams are connected in two different alignments to at least two longitudinal beams and wherein the damping effect is achieved by thrust force damping in the transverse beams.

34 Claims, 13 Drawing Sheets

(56) References Cited

U.S. PATENT DOCUMENTS

| | | | | |
|---|---|---|---|---|
| 6,799,400 | B2* | 10/2004 | Chuang | F16F 7/12 |
| | | | | 188/371 |
| 7,549,257 | B2* | 6/2009 | Chuang | E04H 9/0237 |
| | | | | 52/167.7 |
| 8,590,220 | B2* | 11/2013 | Ozaki | E04H 9/0237 |
| | | | | 52/167.3 |
| 2004/0135056 | A1 | 7/2004 | Chuang | |
| 2011/0031080 | A1 | 2/2011 | Cahis | |
| 2011/0107699 | A1* | 5/2011 | Kawai | E04H 9/0237 |
| | | | | 52/698 |
| 2012/0017523 | A1 | 1/2012 | Ozaki et al. | |
| 2012/0304587 | A1 | 12/2012 | Kenho | |
| 2013/0074427 | A1* | 3/2013 | Kawai | E04H 9/0237 |
| | | | | 188/371 |

FOREIGN PATENT DOCUMENTS

| | | | |
|---|---|---|---|
| JP | 2010-216611 | A | 9/2010 |
| KR | 10-0940554 | B1 | 2/2010 |
| KR | 10-1144596 | B1 | 5/2012 |
| WO | 97/04193 | A1 | 2/1997 |
| WO | 2011/086770 | A1 | 7/2011 |

\* cited by examiner

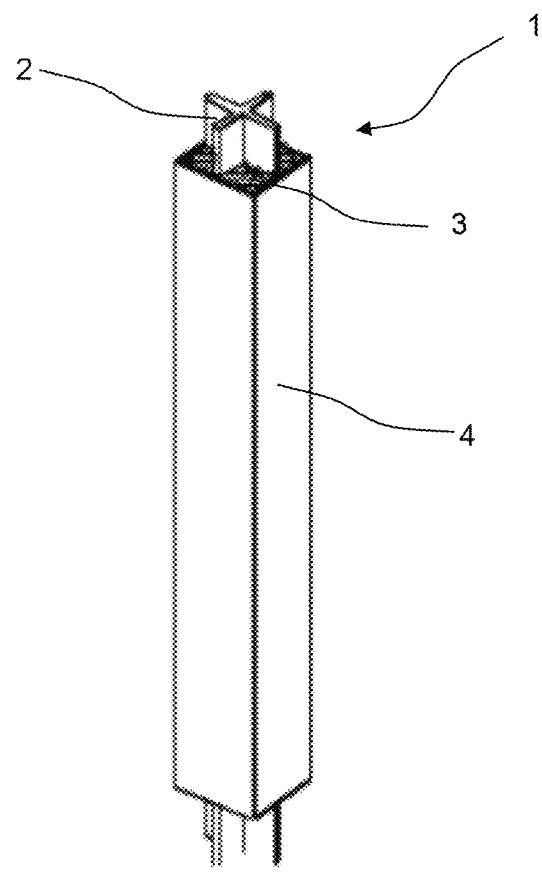
Fig. 1  (State of the art)
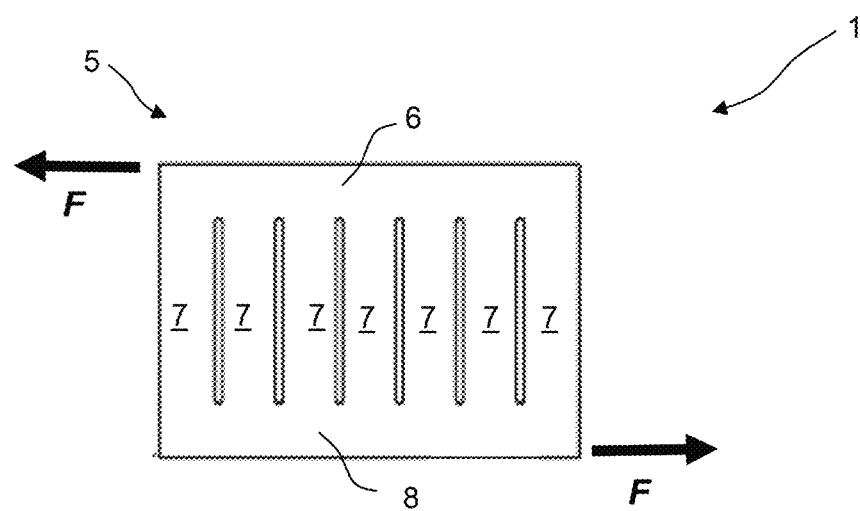
Fig. 2  (State of the art)

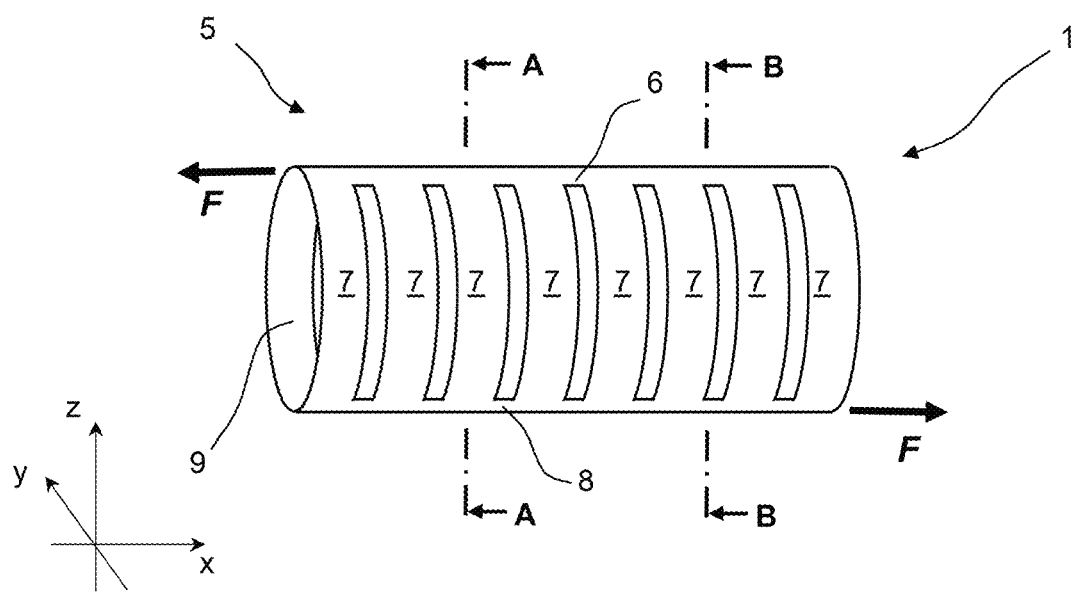
Fig. 3
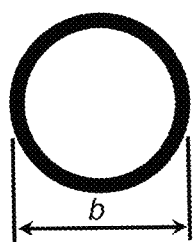
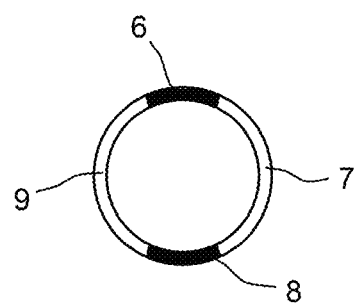
Fig. 4a          Fig. 4b

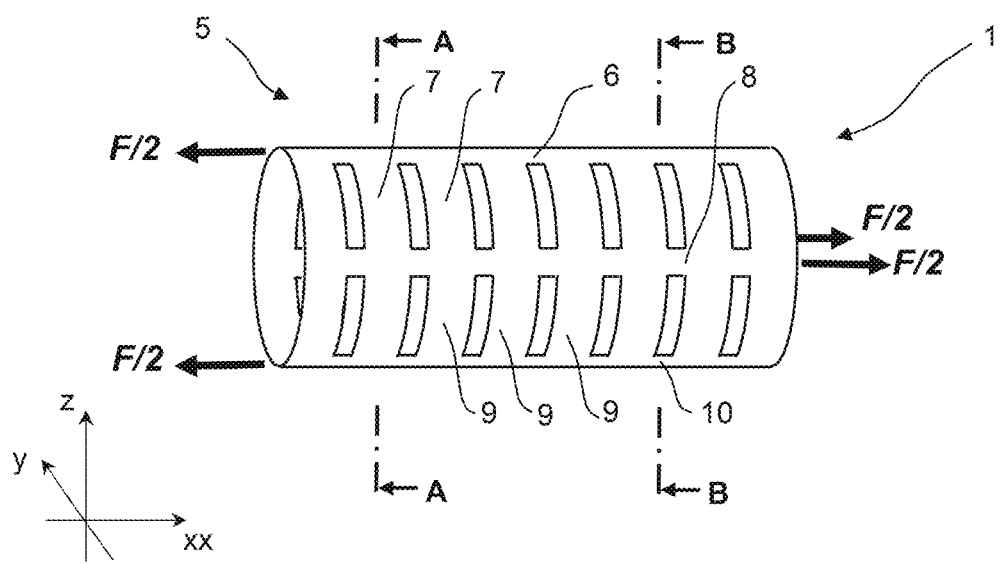
Fig. 5
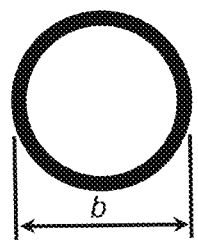 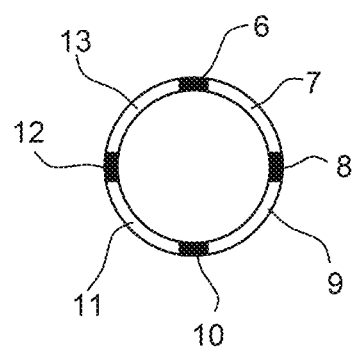
Fig. 6a          Fig. 6b

CONSTRUCTION DAMPER WITH AT LEAST ONE AT LEAST IN REGIONS LADDER-LIKE CONSTRUCTED THRUST DAMPING PART

CROSS-REFERENCE TO RELATED APPLICATIONS

This application is a National Stage of International patent application PCT/EP2020/053123, filed on Feb. 7, 2020, which claims priority to foreign German patent application No. DE 10 2019 201 682.0, filed on Feb. 8, 2019, the disclosures of which are incorporated by reference in their entirety.

FIELD OF THE INVENTION

The present invention relates to a construction damper with at least one at least in regions ladder-like constructed thrust damping part which has at least two longitudinal beams which are connected to each other by at least two rung-like transverse beams which are aligned parallel to each other in a first alignment, wherein the rung-like transverse beams at their ends each are connected to the longitudinal beams in a bending-rigid manner.

BACKGROUND

Construction dampers are used to dissipate kinetic energy introduced from the outside into a construction (the term is intended to be broadly understood and covers, among other things, any buildings, bridges or towers). This is usually done by converting the kinetic energy into thermal energy. This process, also known as dissipation, prevents damage to the construction as a result of such acceleration effects and movements as can be caused, for example, by earthquakes or the like.

There is already a whole range of different construction dampers that use the damping properties of different materials or systems for dissipation. One principle that is very widely known, especially from vehicle construction, is damping by means of hydraulic oil. Another principle of particular economic interest for constructions is the use of plastic deformation of steel sheets. Such a damping system based on the deformation of steel sheets is nowadays referred to in German as "Stahl-Hysterese-Dämpfer" and in English as steel hysteretic damper (SHD damper for short).

A common design of such a SHD damper consists in principle of long thin steel sheets arranged in the manner of a truss rod in the structure of a construction in such a way that they are alternately loaded exclusively in tension or compression due to the construction being set in vibration. To prevent the relatively thin sheets from buckling under the high normal force load, these dampers usually have not only a single sheet strip but additional rigidity means. Thus, a cross-shaped sheet cross-section in plan view has become established and is additionally arranged in a mortar-filled sheathing tube. The mortar-filled sheathing tube prevents the sheet strip from bulging or buckling under the load and stabilizes it when it undergoes alternating plastic deformation. The resulting load-deformation diagram shows a curve in the form of a hysteresis loop. The design of a SHD damper with a truss rod stabilized against bulging is nowadays referred to in English as buckling restrained brace (BRB damper for short).

SHD dampers are significantly less expensive than hydraulic dampers. However, usually and especially in the construction of a BRB damper, they require a large length so that they can develop the necessary damping effect. For this reason, they are mainly used for damping large buildings where sufficient installation space is available. Another design-related disadvantage with especially BRB dampers is that due to the rigidity means, the inner workings of the dampers responsible for the damping effect cannot usually be seen. It is therefore difficult to judge the condition of a BRB damper from the outside. In addition, the very large dimensions of BRB dampers result in that it is very costly to replace a damaged BRB damper after an earthquake.

Thus, there have been repeated investigations in the past as to how the plastic deformation of steel could be used in other ways to damp a construction. One approach that was investigated more than 25 years ago is the generation of shear forces in so-called shear hysteretic panels (SHP dampers for short). These are ladder-like, flat thrust damping parts in which two longitudinal beams are connected to each other by at least two (but usually considerably more than two) bending-rigidly attached transverse beams. Damping is effected in such a way that a normal force is introduced into one of the two longitudinal beams, which is transmitted in a damped manner to the other longitudinal beam by the transverse beams deformed by the thrust force. If a pendulum motion occurs, the normal force introduced into the longitudinal beam will alternately be a tensile or a compressive force, which is dissipated by the plastic deformation of the interposed transverse beams. Here, too, a load-deformation curve with the course of a hysteresis loop is produced.

However, even with this design, buckling of the transverse beams can easily occur. In addition, such a SHP damper can only receive an extremely small deformation, which in particular does not permit its use for damping earthquakes in large and tall constructions. Moreover, the problems of bulging and buckling of the transverse beams increase even more as the deformations become larger. As a result, research on SHP dampers has been discontinued and no practical application of such SHP dampers for damping constructions has occurred.

SUMMARY OF THE INVENTION

Thus, the object of the invention is to provide a construction damper that requires less space than a BRB damper, but at the same time does not have the limitations inherent in SHP dampers with regard to the deformation path and the buckling problem.

The problem can be solved by a construction damper with at least one at least in regions ladder-like constructed thrust damping part which has at least two longitudinal beams which are connected to each other by at least two rung-like transverse beams which are aligned parallel to each other in a first alignment, wherein the rung-like transverse beams at their ends each are connected to the longitudinal beams in a bending-rigid manner, wherein the thrust damping part has, according to the invention, a spatial structure in which at least two further rung-like transverse beams extending parallel to each other are arranged in a second alignment deviating from the first alignment.

Thus, the idea of the invention is to take up again the principle of damping by means of shear forces in ladder-like thrust damping parts, which has actually already been written off among experts. This, in turn, is based on the realization that bulging can be controlled and that the ladder-like structure of the thrust damping part in particular offers a basic layout that can be adapted very well to different requirements.

Thus, according to the invention, the conventional plate-shaped thrust damping part used in SHP dampers is converted into a spatial structure that is significantly better stabilized against bulging or buckling. This spatial structure is created by providing additional rung-like transverse beams which are arranged in a second alignment deviating from the alignment of the first rung-like transverse beams. In addition, by increasing the number of transverse beams for the same length of the longitudinal beams, an increase in the maximum forces to be absorbed can be achieved. The result is significantly improved buckling behavior compared with conventional SHP dampers, with in total greater maximum forces that can be absorbed.

According to one development, the thrust damping part has several transverse beam planes with at least one transverse beam arranged therein, wherein the transverse beam planes are arranged parallel spaced apart along the longitudinal axis of the thrust damping part. In other words, several parallel transverse beam planes are spanned along the longitudinal axis of the thrust damping part with at least one transverse beam disposed therein. The parallel arrangement of the transverse beam planes results in all transverse beams having one common alignment, which means that they can all be stressed for thrust in an effective direction transverse to the transverse beam plane.

According to one development, at least two transverse beams are arranged in each transverse beam plane, of which at least one transverse beam extends in the first alignment and one further transverse beam extends in the second alignment. This allows the transverse beams to stiffen each other in the respective transverse beam plane.

Preferably, several transverse beam planes are arranged at the same distance from each other along the longitudinal axis of the thrust damping part. This standardizes the force distribution and simplifies manufacture.

Accordingly, at least two transverse beam planes each with at least two, preferably four, transverse beams arranged therein can be provided in the thrust damping part. The maximum force that can be introduced into the construction damper can be controlled by the number of transverse beams. The higher the maximum forces to be absorbed, the more transverse beams and transverse beam planes respectively must be provided. In this respect, there is no upper limit to the number of possible transverse beam planes. According to the invention, this results in a very easily adjustable construction damper with respect to the maximum deformations to be absorbed.

Preferably, the thrust damping part is at least partly made of metal. In particular, an implementation of the thrust damping part made of steel has great advantages in that steel is already a widely used material in this field of application and is therefore well researched in terms of its material behavior. Steel can be easily and repeatedly plastically deformed.

According to one development, at least one, preferably all, transverse beam(s) has a thickness which increases towards both ends. This makes the connection of the transverse beams to the longitudinal beams particularly bending-rigid. Thus, very large thrust forces can be introduced into the transverse beams.

According to one development, the thrust damping part has a symmetrical, polygonal and/or round ground plan in plan view of its longitudinal axis. Such a design of the ground plan of the spatially constructed thrust damping part ensures particularly good stiffening of the different transverse beams among each other, also covering torsional forces.

According to one development, the thrust damping part has at least three, preferably four, longitudinal beams. Thus, in plan view of its longitudinal axis, the thrust damping part can have a triangular or quadrangular ground plan.

Thereby it is useful if the longitudinal beams of the thrust damping part are arranged in the corners of a thrust damping part with a polygonal ground plan. In this way, one longitudinal beam can be used to attach transverse beams of two different alignments. A construction damper designed in this way is, thus, particularly efficient.

According to one development, it is conceivable that the longitudinal beams and the transverse beams of the thrust damping part are welded together, in particular if they are made of metal. The welding ensures a particularly rigid connection of longitudinal and transverse beams.

Alternatively or additionally, the thrust damping part can have at least one elongated plate having several parallel slots extending transversely to the longitudinal axis of the plate. This results in an at least in regions flat, ladder-like structure that is very easy to manufacture, but at the same time has several transverse beams created by the slots.

Preferably, the thrust damping part has several multiple-slotted plates arranged at an angle to each other in plan view of its longitudinal axis. In this way, the thrust damping part can be constructed in total from a number of slotted plates, which makes it particularly easy to manufacture.

The plates can also be L-shaped constructed profiles whose leg plates are each slotted several times. Such an L-shaped profile is easy to machine and is also very efficient in terms of manufacturing costs.

However, it is also conceivable that the thrust damping part has a tube in which in at least one tube wall several parallel slots extending transversely to the longitudinal axis of the tube are arranged and constructed in such a way that in the longitudinal direction of the tube there are at least two continuous wall sections. These continuous wall sections form the longitudinal beams of the thrust damping part, while the wall sections extending transversely to the longitudinal axis between the slots form the rung-like transverse beams.

In the simplest embodiment, it is conceivable to use a cylindrical tube of steel as the starting product and to slot it several times on both sides, for example, so that two longitudinal beams and transverse beams each extending left around or right around, respectively, from left and right of these longitudinal beams are formed, which then absorb tensile pressure movements applied along a longitudinal axis of the tube in response to thrust in a damping manner. However, since this simplest embodiment can result in relatively long lengths of the transverse beams, it may be useful to shorten the length of the slots and, thus, increase the width of the longitudinal beams.

Alternatively, the slots can each be shorter and provided in greater number for this purpose. In this way, the tube can be divided into four quarter-circle segments. At least one slot not covering the entire segment is arranged in each segment. If several such slots are arranged in parallel along the longitudinal axis, four unslotted regions are formed which extend along the longitudinal axis and which each form a longitudinal beam. In this way, a thrust damping part with four longitudinal beams and many transverse beams arranged in the same planes can be produced in a relatively simple manner from a round tube.

According to one development, at least one tube wall is at least partially flat and/or curved. The tube may also have a round and/or polygonal cross-section in plan view of its longitudinal axis. Square tubes in particular have great advantages in terms of production technology and can be used very well for implementing the invention. In this case, it is particularly easy to obtain flat and ladder-like tube wall sections which can be well constructed in terms of their damping behavior.

According to one development, at least one thrust damping part has at least one, preferably clasp-like constructed, force introduction means. This can connect at least the ends of two non-adjacent longitudinal beams of one thrust damping part. Non-adjacent longitudinal beams are to be understood as longitudinal beams which are loaded with tension or compression in the same direction, while adjacent longitudinal beams are to be understood as longitudinal beams which are connected to the respective longitudinal beam by transverse beams and are, thus, loaded in the respective opposite direction. In practice, at least one longitudinal beam is, thus, bridged by the force introduction means. Due to the force introduction means, the force is nevertheless introduced evenly into the two respective adjacent longitudinal beams.

According to one development, at least one first force introduction means is attached to the two ends located on one side of two diagonally opposite, non-adjacent longitudinal beams of a thrust damping part that is quadrangular in ground plan. A second force introduction means is then fastened diagonally to the two ends located on the other side of the other two longitudinal beams. The two force introduction means are, thus, arranged at 90° to each other at the construction damper or the thrust damping part. As a result, the two force transmission means do not interfere with each other even in the moving state. This is not the case even if they are constructed to at least partially encompass the thrust damping part.

According to one development, at least one force introduction means is constructed as a flat plate with a u-shaped recess, the legs of which laterally encompass the thrust damping part and at the leg ends of which a load introduction beam connecting the two leg ends is arranged, which is connected to the ends of two longitudinal beams. Thus, the load introduction beam is suitably fastened, for example welded, to the ends of the legs after the force introduction means has been introduced.

Usefully, at least one force introduction means has a fastening means, which in turn preferably has a bore for attaching or fastening the construction damper to the construction, wherein the bore is arranged on the side of the force introduction means opposite the load introduction beam.

According to one development, at least two thrust damping parts are connected by means of at least one connecting means. In this way, a module-shaped structure can be created in which, depending on the required maximum damping effect, several thrust damping parts are brought into an operative connection with each other by such connecting means. If, for example, two identically constructed thrust damping parts are connected to each other, this allows the maximum deformations that can be absorbed to be doubled compared to an embodiment with only one such constructed thrust damping part.

The series connection of several thrust damping parts constructed according to the invention enables the absorption of large deformation paths, which is so important for construction damping of earthquakes, with high bulging and buckling stability. By using several thrust damping parts of the same structure, it is possible to create a modular structure that offers major advantages in terms of production technology. In this way, a damper that can be readily adapted to a wide range of conditions can be created with relatively little effort. It is only necessary to connect a sufficient number of thrust damping parts to each another, depending on the operating conditions. In this way, it is in particular also possible to overcome the disadvantages of the low deformation capacities of conventional SHP dampers, which were previously considered insurmountable.

It is also useful if at least one thrust damping part has a damping effect which differs from that of the other thrust damping part(s). This can be done, for example, by having a different number of transverse beams. In this way, the damping effect of the construction damper can be adjusted very precisely to the expected loads to be damped.

According to one development, two differently rigid thrust damping parts are connected to each other in such a way that in case of a small earthquake only the less rigid thrust damping part is activated and in case of a large earthquake both the more rigid and the less rigid thrust damping part are activated. Thus, by connecting different thrust damping parts in series, the damping properties of the construction damper can be specifically designed for earthquake loads of different magnitudes.

Alternatively, at least two differently rigid thrust damping parts are connected to each other in such a way that in case of a small earthquake only the less rigid thrust damping part is activated and in case of a large earthquake only the more rigid thrust damping part (5) is activated. This leads to a smoothing of the hysteresis curve, i.e. the damping properties, of the construction damper in the load-deformation diagram.

So that the activity of a thrust damping part can be influenced in a targeted manner, at least one connecting means has a locking system for limiting and/or suppressing movements of at least one thrust damping part arranged therein.

According to one development, the connecting means has two u-shaped recesses, the legs of which each laterally encompass one thrust damping part and at each of the leg ends of which there is arranged a load introduction beam connecting the two leg ends, which is connected to the ends of two non-adjacent longitudinal beams of the respective thrust damping part. In other words, the connecting means also bridges the respective adjacent longitudinal beam.

BRIEF DESCRIPTION OF THE DRAWINGS

The invention is explained in more detail below with reference to examples of embodiments shown in the drawings. These schematically show:

FIG. 1 a BRB damper known from the prior art;

FIG. 2 a SHP damper known from the prior art;

FIG. 3 a first embodiment of a construction damper according to the invention;

FIG. 4a the section A-A shown in FIG. 3;

FIG. 4b the section B-B shown in FIG. 3;

FIG. 5 a second embodiment of a construction damper according to the invention;

FIG. 6a the section A-A shown in FIG. 5;

FIG. 6b the section B-B shown in FIG. 5;

DETAILED DESCRIPTION

Figure 7:
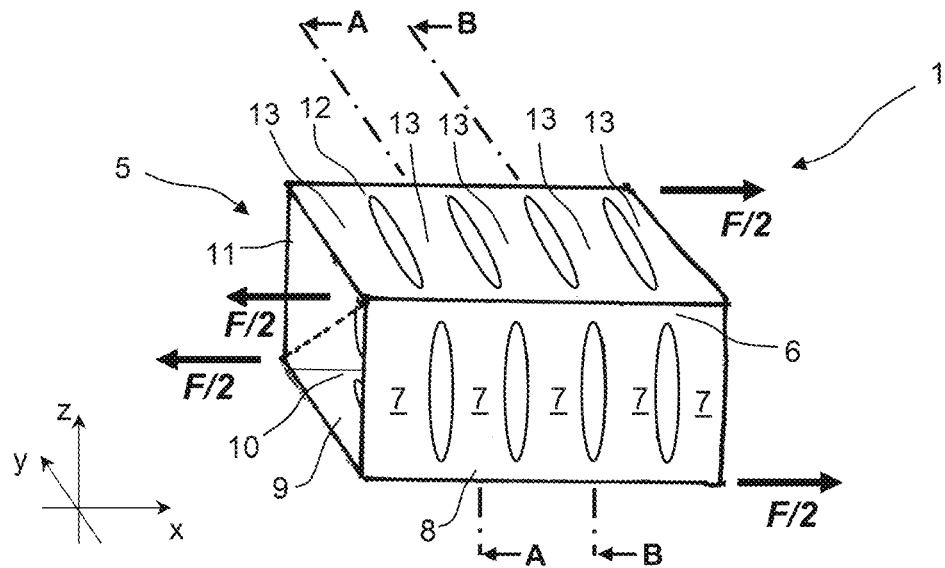
FIG. 7 a third embodiment of a construction damper according to the invention.

The construction damper 1 shown in FIG. 1 is a conventional BRB damper in which a steel beam 2 with a cruciform cross-section is arranged in a tube 4 filled with mortar 3. The friction between the steel beam 2 and the mortar 3 is reduced by a lubricant layer placed between them so that the steel beam 2 can deform relatively freely in the longitudinal direction within the mortar 3.

If an earthquake occurs, a normal force is introduced into the construction damper 1 under which the steel beam 2 initially deforms elastically and then plastically after exceeding the yield point. The plastic deformation continues until the oscillatory motion of the construction is reversed. After initial elastic deformation, yielding occurs again until the oscillatory motion of the construction is reversed again and the construction starts to move in the other direction. With yielding of the steel beam 2, a part of the kinetic energy is converted into thermal energy. This damping gradually reduces the pendulum motion of the construction.

FIG. 2 shows a construction damper 1 as known in the prior art as a so-called SHP damper. This has a flat, ladder-like thrust damping part 5, which has at least two longitudinal beams 6 and 8, which in turn are connected to each other in a thrust-resistant manner by at least two, in this case seven, transverse beams 7. The operating principle is such that, due to an action introduced into the construction (e.g. impact load or earthquake load), a force F is introduced into the longitudinal beam 6 and from there is introduced by the bending-rigidly connected transverse beams 7 into the second longitudinal beam 8, which is located below in the present case. Thus, damping takes place by the plastic deformation of the transverse beams 7 generated by thrust forces.

As already explained above, it has been shown that the flat, ladder-like thrust damping part 5 of an SHP damper is very sensitive to buckling of the transverse beams 7 and generally also does not develop sufficient damping effect to be used in large and high buildings for damping earthquake loads.

The solution according to the invention is shown in the first embodiment of a construction damper 1 according to the invention shown in FIG. 3, FIG. 4a and FIG. 4b. This has a thrust damping part 5 with a spatial structure in which at least two (in this case eight) transverse beams 7 extend in a first alignment 7 (in FIG. 4b starting from the longitudinal beam 6 and curving downwards in a right-hand direction) and at least two (in this case eight) further rung-like transverse beams 9 arranged parallel to each other extend in a second alignment deviating from the first alignment (in FIG. 4b starting from the longitudinal beam 6 and curving downwards in a left-hand direction). With the aid of this spatial structure of the thrust damping part 5, it is possible to overcome the main disadvantage of conventional SHP dampers, namely the severely limited deformability of the transverse beams before any buckling of the transverse beams occurs.

The thrust damping part 5 has an overall elongated shape. Its longitudinal direction extends in the x-direction in the present case in which the two longitudinal beams 6 and 8 also extend. In this respect, the horizontal force F to be introduced into the construction damper 1 is introduced into the first longitudinal beam 6 and introduced into the second longitudinal beam 8 by the transverse beams 7 of the first alignment and the transverse beams 9 of the second alignment and, due to the deformation of the transverse beams 7 and 9, is reintroduced into the construction in a damped manner from the thrust damping part 5 or the construction damper 1.

As can be seen in particular from the sectional views of FIG. 4a and FIG. 4b, the thrust damping part 5 has a circular cross-section in the plan view of its longitudinal axis. Thus, it can also be described as a multiple-slotted round tube with a circular cross-section and the outer diameter b and a thickness t.

Thus, the longitudinal axes of the curved transverse beams 7 and 9 extend in a respective plane parallel to the y-z plane. If the transverse beam planes in FIG. 3 are numbered from left to right, the first transverse beam plane of the thrust damping part 5 extends parallel to the y-z plane as the first plane. This first transverse beam plane is followed by seven further transverse beam planes, viewed from left to right, in each of which one transverse beam 7 of the first alignment and one transverse beam 9 of the second orientation are arranged. In this respect, the construction damper 1 shown in FIG. 3 has a thrust damping part 5 with eight transverse beam planes and 16 transverse beams 7, 9. In the embodiment shown here, the transverse beam planes are all arranged at the same distance from each other along the longitudinal axis of the thrust damping part 5 extending in the x-direction.

The second embodiment of a construction damper 1 according to the invention shown in FIG. 5, FIG. 6a and FIG. 6b differs from the first embodiment in that here four longitudinal beams 6, 8, 10 and 12 are arranged parallel to each other and four transverse beams 7, 9, 11 and 13 are arranged in each of the eight transverse beam planes. Thus, with the same total load F, the force introduced into the respective longitudinal beams 6, 8, 10, 12 can be halved (F/2) compared to the first embodiment.

Figure 8A:
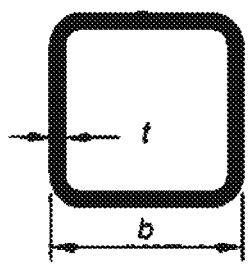
FIG. 8a the section A-A shown in FIG. 7.
Figure 8B:
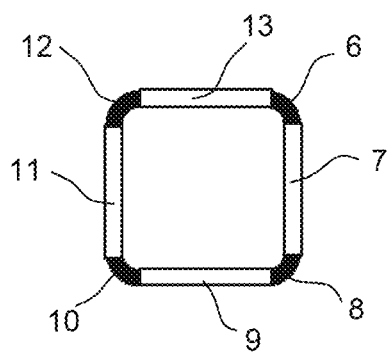
FIG. 8b the section B-B shown in FIG. 7.

The third embodiment of a construction damper 1 according to the invention shown in FIG. 7, FIG. 8a and FIG. 8b differs from the first two embodiments, in addition to the smaller number of transverse beam planes (five instead of eight), primarily in that the thrust damping part 5 has a substantially square ground plan in the plan view of its longitudinal axis. Thus, the thrust damping part 5 now has four straight transverse beams 7, 9, 11, 13 per transverse beam plane instead of the curved ones. Thus, it can also be described as a tube of thickness t with a square cross-section and external width b that is slotted several times at the side walls.

As can be seen in particular from FIG. 8b, in the embodiment shown here the four longitudinal beams 6, 8, 10, 12 are each located in the corners of the tube or of the thrust damping part 5. This has advantages in manufacturing. However, it also leads to a deformation behavior of the thrust damping part 5 that is easier to control.

Figure 9A:
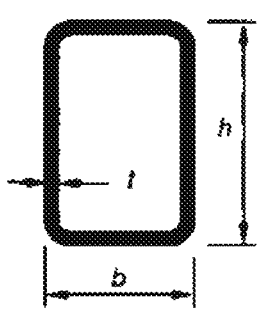
FIG. 9a a section A-A corresponding to FIG. 8a through a fourth embodiment of a construction damper according to the invention.
Figure 9B:
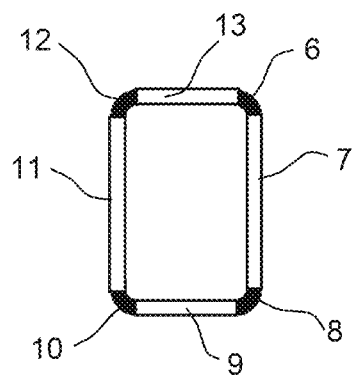
FIG. 9b a section B-B corresponding to FIG. 8b through a fourth embodiment of a construction damper according to the invention.

As an alternative to a square ground plan, however, it is also conceivable to use a rectangular ground plan for the thrust damping part 5, as exemplified by the sections shown in FIG. 9a and FIG. 9b. In this way, different rigidity of the thrust damping part 5 can be generated.

Figure 10A:
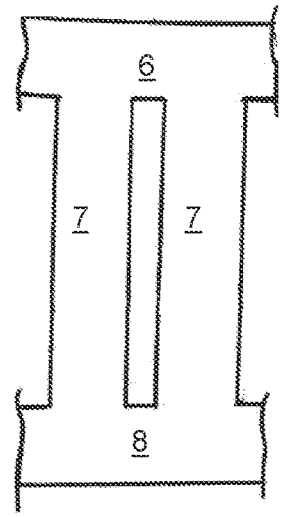
FIG. 10a an embodiment of a transverse beam with constant height.
Figure 10B:
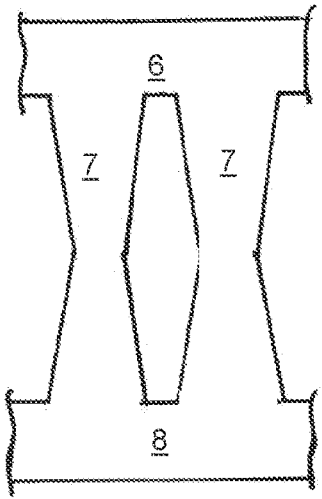
FIG. 10b an embodiment of a transverse beam with a beam height increasing towards the beam ends.
Figure 10C:
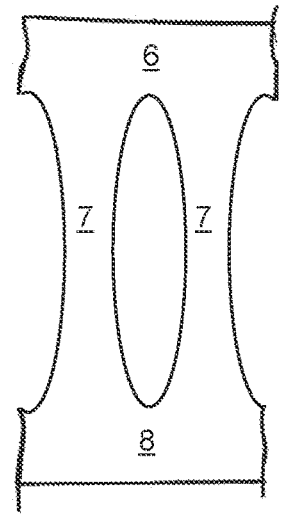
FIG. 10c another alternative embodiment of a transverse beam with a beam height increasing towards the beam ends.

The rigidity of the thrust damping part 5 can also be controlled by shaping the height of the transverse beams. For example, it is conceivable to use transverse beams 7 with a constant height, as shown in FIG. 10a. However, shapes in which the transverse beams 7 have an increasing height at their ends, as shown in FIG. 10b or in FIG. 10c, have proved to be particularly suitable.

Figure 11:
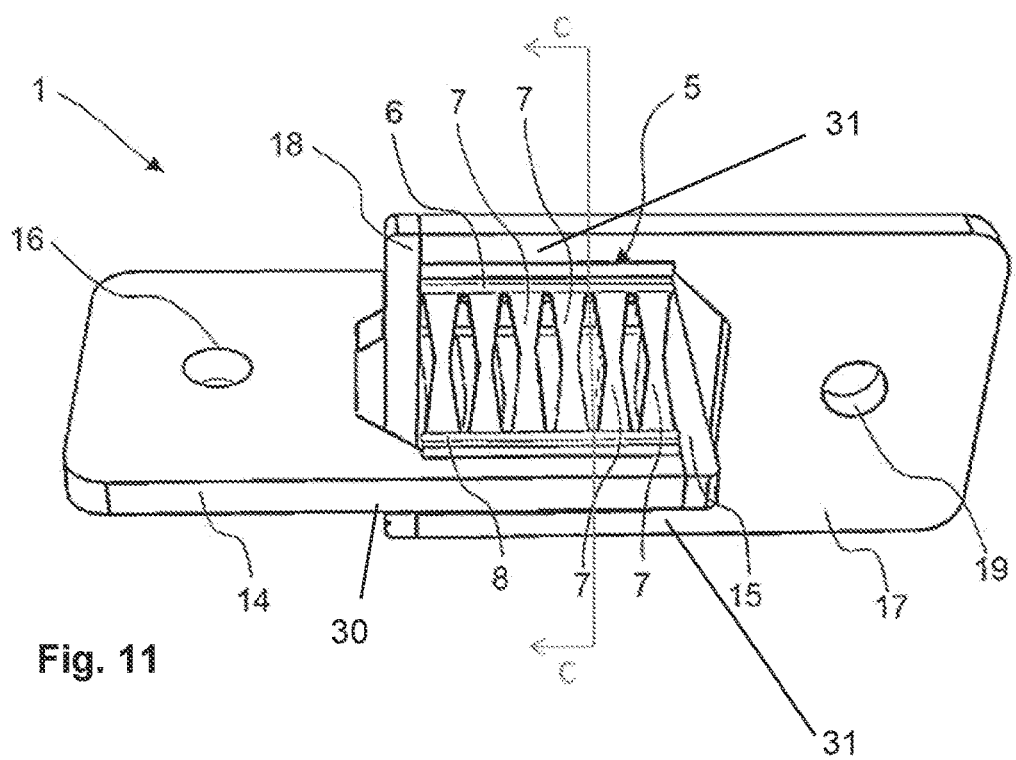
FIG. 11 a fifth embodiment of a construction damper according to the invention.

The fifth embodiment of a construction damper 1 according to the invention shown in FIG. 11 is an embodiment in which the thrust damping part 5 is constructed in principle in the same way as the third embodiment shown in FIG. 7. Here, too, the thrust damping part 5 has a square ground plan in plan view. However, it has six transverse beam planes instead of five. In each of the transverse beam planes, just as in the third embodiment, four differently aligned, flat transverse beams 7, 9, 11, 13 are arranged. The transverse beams 7, 9, 11, 13 in turn have a shape as shown in FIG. 10b. Thus, they all have a beam height that increases towards the beam ends.

In this case, the force is introduced by means of two plate- and clasp-like force introduction means 14 and 17 each of which has a bore 16 and 19 for fastening to the construction and, thus, for introducing force into the construction damper 1. Forced introduction means 14 has a U-shaped recess for accommodating thrust damping part 5 with parallel legs 30 defining the recess. Force introduction means 17 has a U-shaped recess for accommodating thrust damping part 5 with parallel legs 31 defining the recess. The two force introduction means 14 and 17 are rotated by 90° relative to each other and are each attached to two non-adjacent longitudinal beams 8 and 12 or 6 and 8. In the present case, they are welded longitudinally to the respective longitudinal beams 6, 8, 10, 12. After fastening the thrust damping part 5, a traverse 15 or 18 is fastened to the ends of each of the two clasp-like force introduction means 14 and 17. These again significantly stabilize the respective force introduction means 14 and 17 and also lead to an enlarged stability of the thrust damping part 5 and of the entire construction damper 1. Due to the spatial structure of the thrust damping part 5 achieved in this way, a construction damper 1 constructed in accordance with the invention in this way shows a maximum force absorption capacity enlarged by the number of transverse beams, with a considerably improved stability and load-bearing capacity of the construction damper 1 according to the invention with respect to bulging, compared to a conventional SHP damper.

Figure 12:
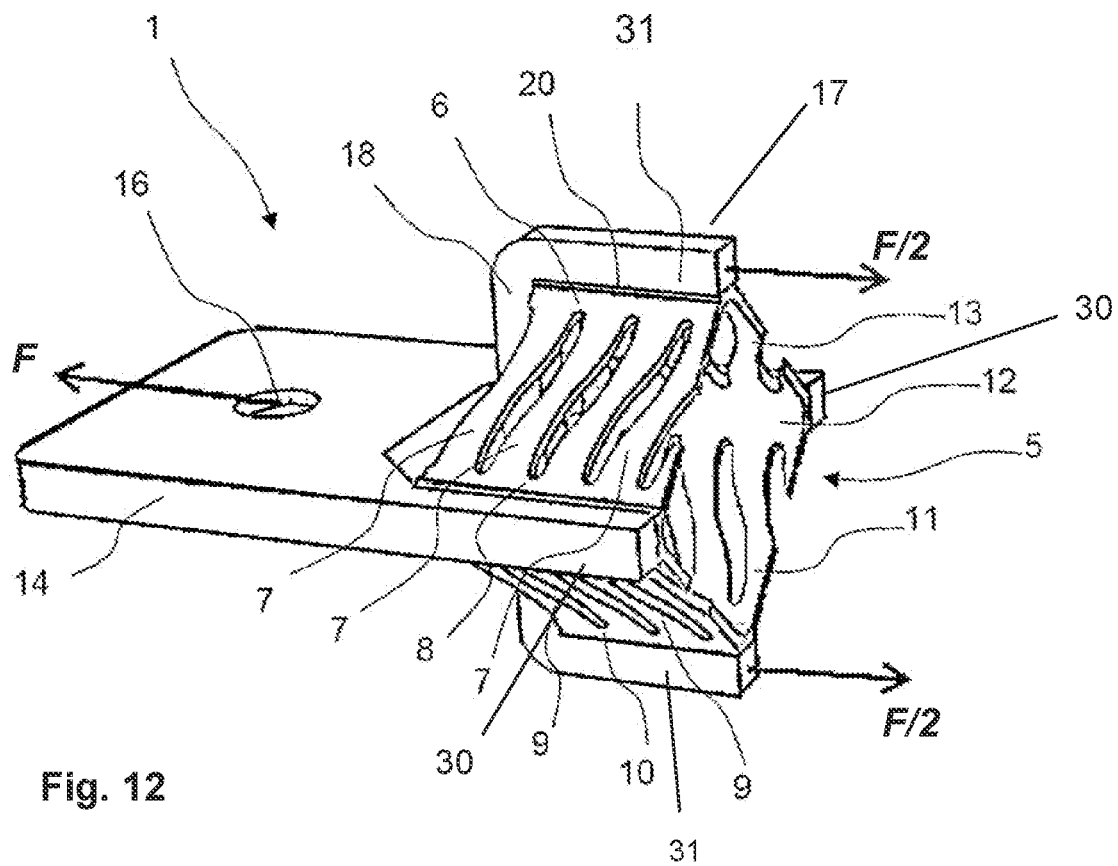
FIG. 12 the section C-C shown in FIG. 11 with representation of the internal force distribution.

As can be seen from the spatial sectional view in FIG. 12, the force F introduced into the construction damper 1 is introduced into the two non-adjacent longitudinal beams 8 and 12 of the thrust damping part 5 by the bore 16 and the force introduction means 14. This leads to a deformation of the transverse beams 7, 9, 11, 13 and to a reaction force F/2 in the two longitudinal beams 6 and 10.

Figure 13:
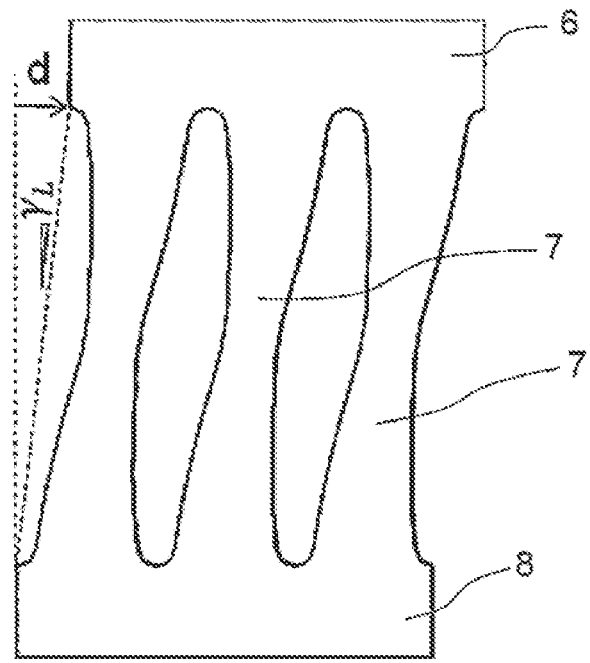
FIG. 13 a side view of a portion of the sidewall of the in regions ladder-like constructed thrust damping part shown in FIG. 11 in the deformed state.

FIG. 13 shows the deformation of the transverse beams 7 by the dimension d at the end and the angle γ.

Figure 14:
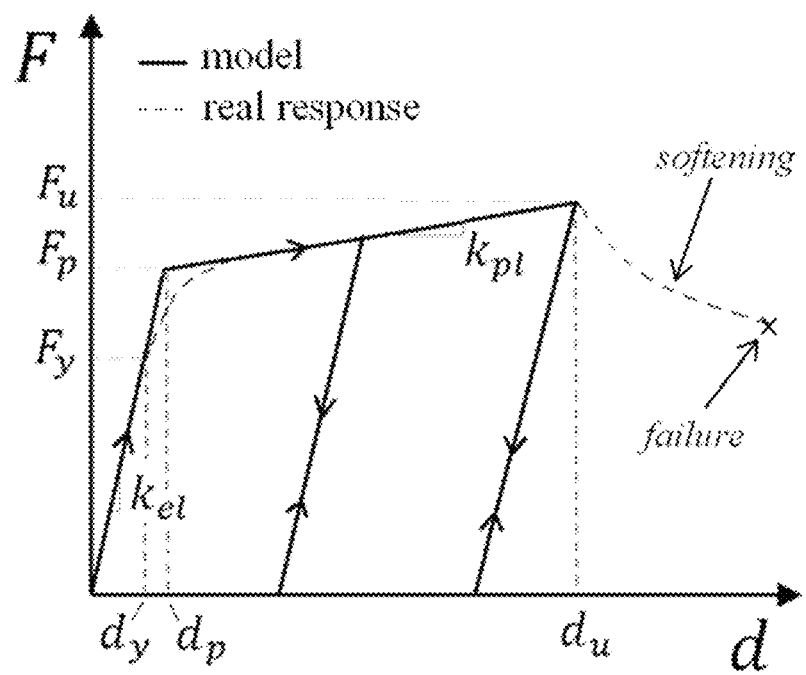
FIG. 14 a force-deformation diagram showing a bilinearly modeled deformation behavior of a construction damper according to the invention.

FIG. 14 now shows the deformation behavior of a construction damper 1 according to the invention in a force-deformation diagram. This can be simplified bilinearly as shown with the solid line. The dotted line shows the actual behavior. Accordingly, elastic deformation initially occurs as the force increases sharply. When the force designated as $F_y$ is reached, yielding of the transverse beams occurs. Now, only a little more force can be introduced into the transverse beams. Simplified, however, it is assumed that elastic behavior still exists up to the point $F_p$. From this point, a linear increase in the forces that can be absorbed can also be assumed up to the point $F_{max}$. From this point on, softening of the material (in this case steel) begins and failure occurs with further increasing deformations and decreasing forces. The construction damper 1 must therefore be designed in such a way that the force $F_{max}$ is not exceeded in the maximum load case.

Figure 15:
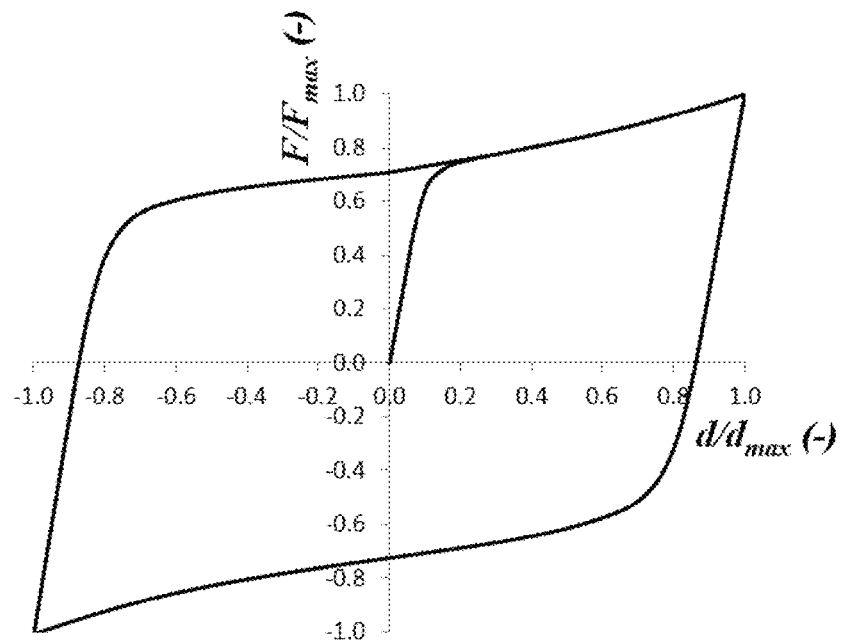
FIG. 15 the computationally determined deformation behavior of the construction damper according to the invention shown in FIG. 11.

The force-deformation diagram shown in FIG. 15 shows a full load cycle for the construction damper 1 shown in FIG. 11 to FIG. 13. The curve shown here is based on a computational simulation. Accordingly, a very uniform hysteresis can be determined for the deformation behavior of the construction damper 1 constructed according to the invention.

Figure 16A:
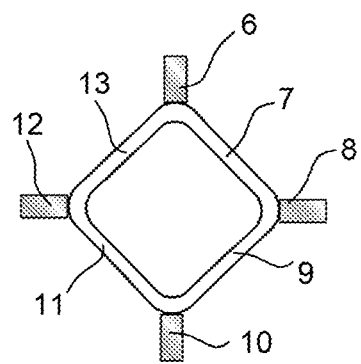
FIG. 16a a first embodiment of a thrust damping part welded together from several parts.
Figure 16B:
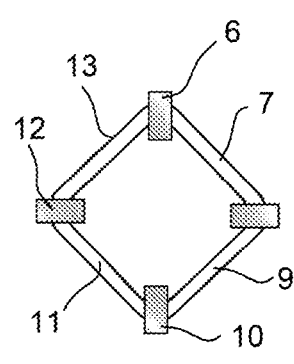
FIG. 16b a second embodiment of a thrust damping part welded together from several parts.
Figure 16C:
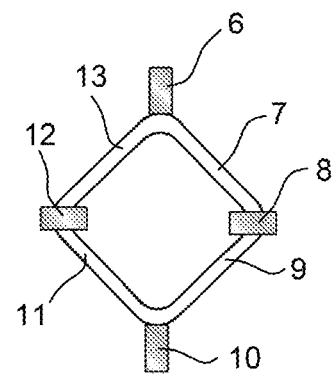
FIG. 16c a third embodiment of a thrust damping part welded together from several parts.

FIGS. 16a, 16b and 16c show three further embodiments of thrust damping parts 5 constructed in accordance with the invention, these being characterized in that they have been welded together from several individual parts. The embodiment shown in FIG. 16a is a thrust damping part 5 in which several square rings are welded in parallel between four longitudinal beams 6, 8, 10 and 12, the sides of which form the four transverse beams 7, 9, 11, 13. Due to their square shape and the corners welded to the longitudinal beams 6 and 8, these rings are comparable in their mode of operation to single transverse beams.

FIG. 16b shows an alternative embodiment in which single strip-shaped transverse beams 7, 9, 11, 13 are welded in between each of the four longitudinal beams 6, 8, 10, 12.

A third alternative is shown in FIG. 16c, in which two narrow L-profiles are inserted between the four longitudinal beams 6, 8, 10, 12 and are also welded to them. The L-profiles each form two transverse beams 7, 13 or 9, 11 of the thrust damping part 5. L-profiles can be easily cut to strip shape and welded to the longitudinal beams.

Figure 17:
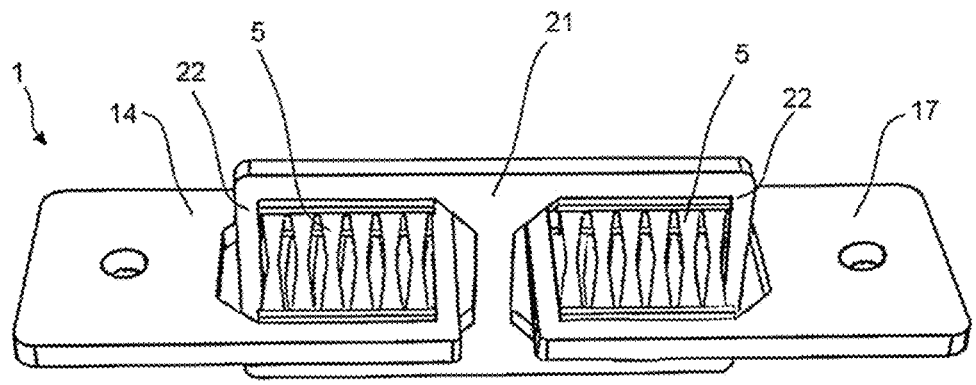
FIG. 17 a sixth embodiment of a construction damper according to the invention with two square-tube-shaped thrust damping parts.

With reference to the sixth embodiment of a construction damper 1 constructed according to the invention shown in FIG. 17, a further aspect of the invention will now be explained, which can be achieved by connecting two thrust damping parts 5 in series in a construction damper 1 by means of a likewise plate-shaped connecting means 21 with traverses 22 provided at the ends. Indeed, by connecting several thrust damping parts 5 in series, it is possible to achieve a damping constant $d_{max}$ that is many times greater than that of SHP dampers. This is not trivial.

By connecting several thrust damping parts 5 in series, the damping properties of the construction damper 1 according to the invention can be adapted very precisely, and this can be done in a very economical manner. This is because the thrust damping parts 5 can be very easily prefabricated and then joined together as required. For example, it is conceivable that they can simply be cut to length as required and then coupled together as shown in FIG. 17.

Figure 18:
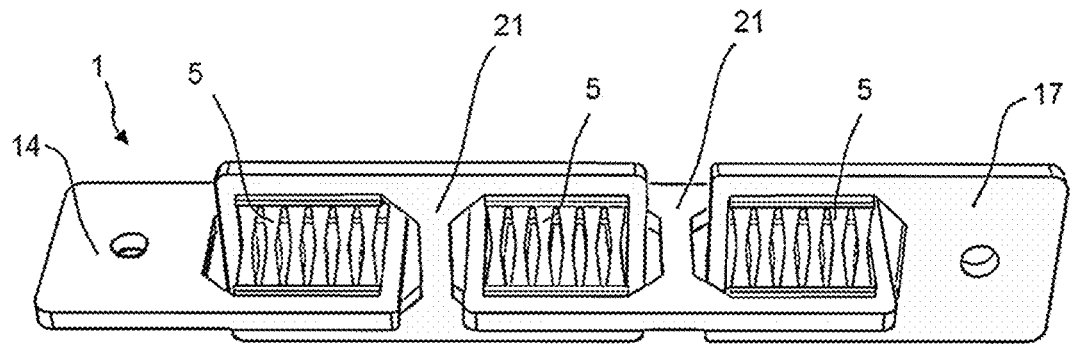
FIG. 18 a seventh embodiment of a construction damper according to the invention with three square-tube-shaped thrust damping parts.

In the seventh embodiment shown in FIG. 18, three thrust damping parts 5 are connected in series by using two connecting means 21 arranged at 90 degrees to each other. This allows the maximum permissible deformation to be tripled compared with a conventional SHP damper.

Figure 19:
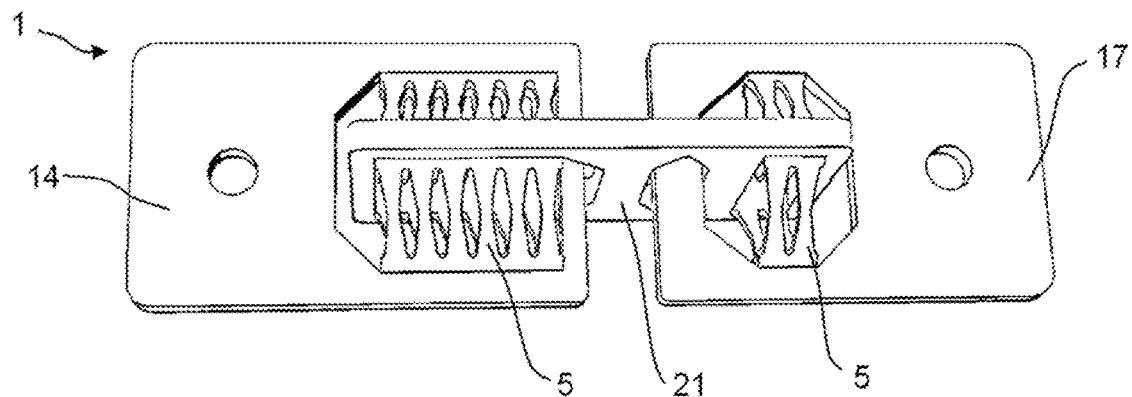
FIG. 19 an eighth embodiment of a construction damper according to the invention with two differently constructed square-tube-shaped thrust damping parts, one having fewer transverse beam planes than the other.

In the example shown in FIG. 19, two differently constructed thrust damping parts 5 are connected to each other by the connecting means 21. Although they both have the same ground plan, they are of different lengths and have a different number of transverse beams 7, 9, 11, 13. In the first thrust damping part 5 shown on the left in FIG. 19, there are six transverse beam planes and four longitudinal beams 6, 8, 10, 12 arranged in the corners. In the second thrust damping part 5 arranged on the right, there are only two transverse beam planes. Thus, the thrust damping part 5 shown on the left has a greater rigidity than the thrust damping part 5 shown on the right.

The two thrust damping parts 5 are connected by a plate-like constructed connecting means 21 in the present example, which is connected at its corner points to the respective longitudinal beams 6, 8, 10, 12.

Figure 20:
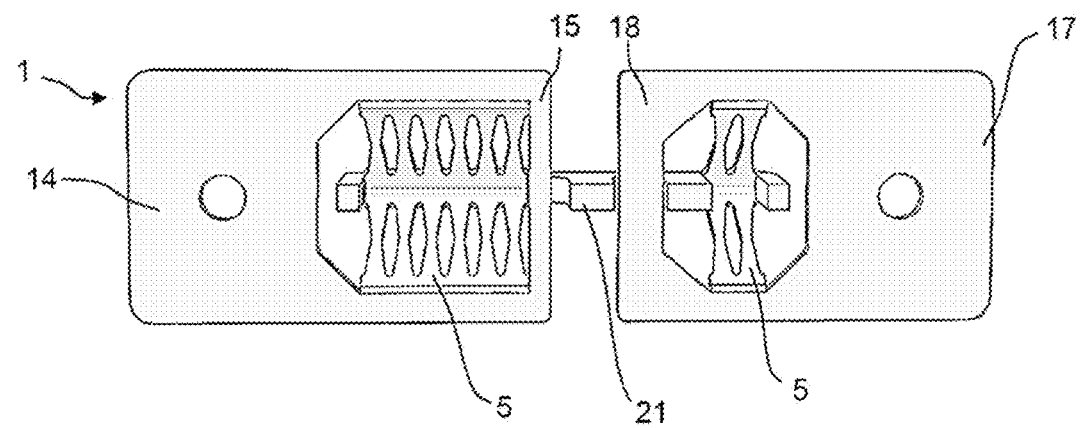
FIG. 20 a section through the embodiment shown in FIG. 19.
Figure 21:
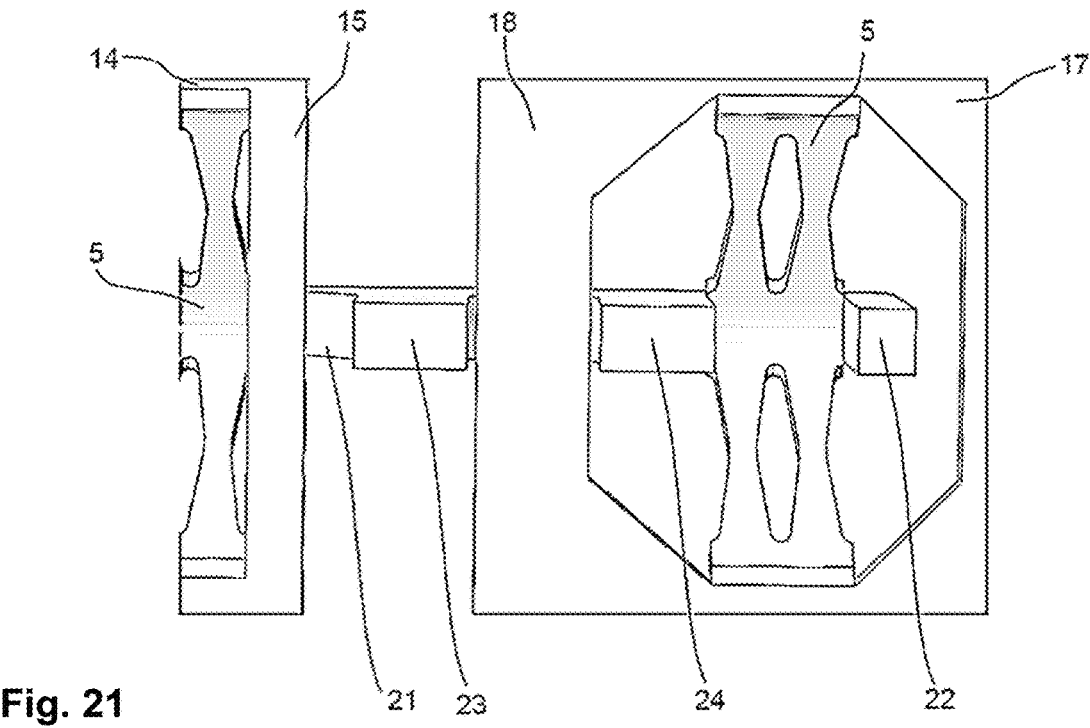
FIG. 21 an enlarged section of the section shown in FIG. 20.

As can be seen in the sectional view FIG. 20 and the enlarged section shown in FIG. 21, the connecting means 21 has two webs 23 and 24. These have a certain distance to the traverses 15 and 18. This allows the damping behavior of the construction damper 1 to be adjusted in a targeted manner. Thus, the mechanical system shown in FIG. 21 of a damper consisting of two dampers connected in series is established, in which the softer damper (shown on the right in FIG. 22) has a stop that becomes active when the right thrust damping part 5 (shown on the right in FIG. 19), which has less transverse beams, reaches its maximum plastic deformation.

Then the left-hand thrust damping part 5, which has a greater rigidity, is activated by the webs 23 and 24. Overall, a deformation behavior is obtained which is shown in a simplified linear form in FIG. 23. In computational simulation, the hysteresis shown in FIG. 24a can be determined for the deformation and the associated damping behavior of the construction damper 1 according to the invention.

Figure 22A:
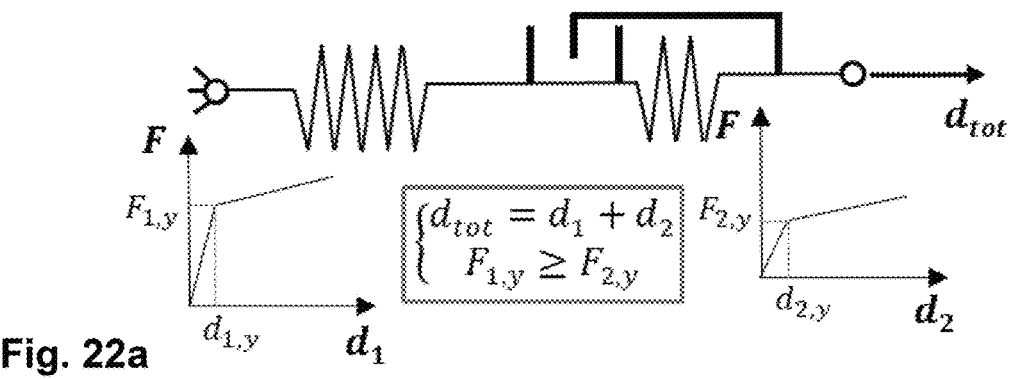
FIG. 22a the mechanical system of the embodiment shown in FIG. 19 with gap connection system.
Figure 23:
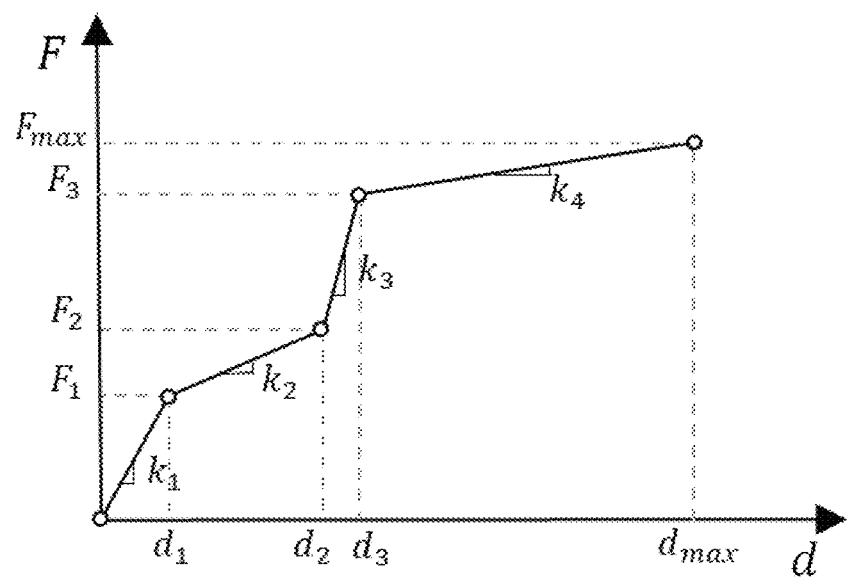
FIG. 23 the multilinear modeled deformation behavior of the construction damper according to the invention shown in FIG. 19.

The mode of operation of the connection system with gap closure connection shown in FIG. 21 will now be explained with reference to the mechanical system shown in FIG. 22a and the associated force-deformation diagram shown in FIG. 23. Namely, the gap closure connection system enables the creation of a construction damper 1 with two different rigidities, resulting in two different force levels each generating plastic deformation, as may occur under different earthquake loads in a construction.

Thus, the construction damper 1 is constructed in such a way that in case of a smaller earthquake, the generated deformation d is smaller than d2 (d<d2). Accordingly, the construction damper is softer and provides only a smaller damping force (F<F2). This allows a more elastic structure for the construction. This ensures that smaller maximum accelerations are introduced into the construction during small earthquakes. This is a significant and non-trivial improvement of the construction damper 1 according to the invention compared to conventional SHP and BRB dampers. It allows a significantly improved protection of the non-structural or load-bearing parts of the construction, such as the electrical equipment or the interior furnishings.

In case of large earthquakes, larger deformations occur in the construction (d>d3). Now the damper 1 according to the invention is also able to provide a larger damping force (F3<F<Fmax). Also, the rigidity is now significantly greater, which means that the construction is better protected against failure.

Figure 24A:
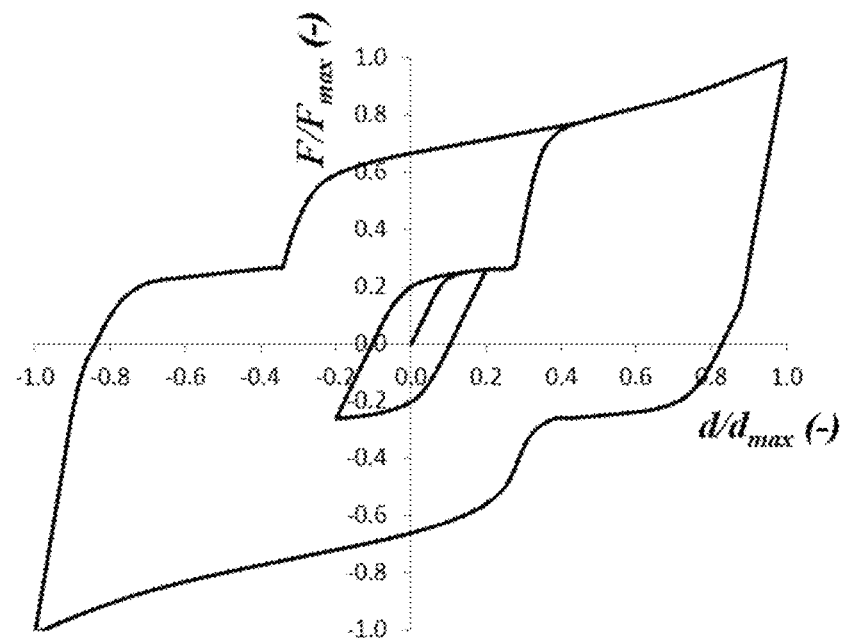
FIG. 24a the computationally determined deformation behavior of a construction damper constructed according to FIG. 22a with a gap connection system.

FIG. 24a shows the hysteresis loop of the construction damper 1, where the inner loop corresponds to the behavior in case of a small earthquake, while the outer part of the loop shows the behavior in case of a large earthquake.

Figure 22B:
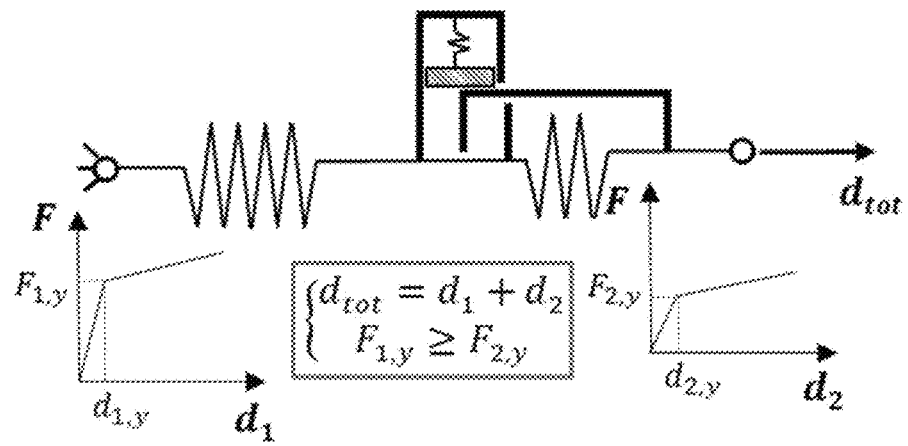
FIG. 22b the mechanical system of an embodiment constructed according to FIG. 19 which additionally has a locking system for one of the two thrust damping parts.

FIG. 22b shows the mechanical system of an alternative embodiment of a construction damper 1 according to the invention. This differs from that of FIG. 22a in that here the construction damper 1 also has a locking system for the thrust damping part 5 shown on the left of the figure. This ensures that when the deformation d exceeds d (d>d2) for the first time, the thrust damping part 5 can no longer deform. Now only the thrust damping part 5 drawn in the system on the right contributes to the damping of the earthquake.

Figure 24B:
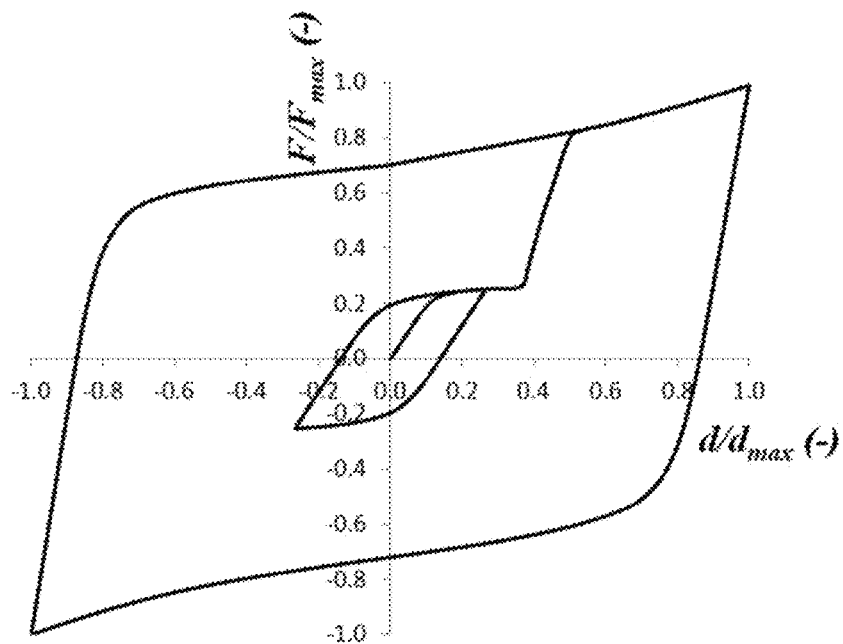
FIG. 24b the computationally determined deformation behavior of a construction damper constructed according to FIG. 22b with a locking system.

FIG. 24b shows the hysteresis loop of a construction damper 1 constructed according to FIG. 22b, where the inner loop again corresponds to the behavior in case of a small earthquake, while the outer part of the loop shows the behavior in case of a large earthquake. As can be seen in particular by comparison with the curve in FIG. 24a, this embodiment makes it possible to increase the total amount of energy to be dissipated (this corresponds to the area inside the hysteresis curve). This follows from the much smoother curve at large earthquake loads compared to FIG. 24a. This embodiment consequently leads to better protection of the construction during large or severe earthquakes with approximately the same good damping behavior during small earthquakes.

Figure 25A:
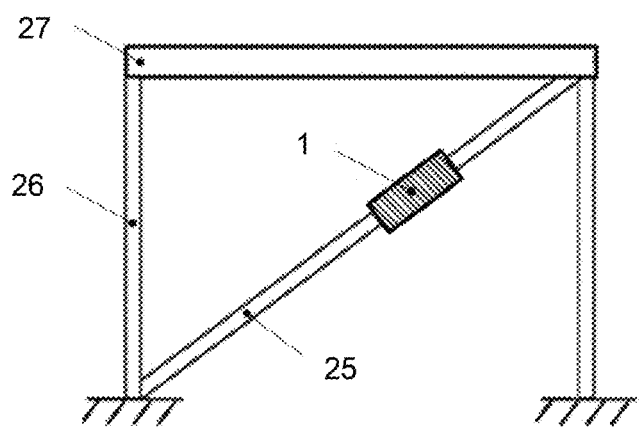
FIG. 25a a first example of how a construction damper according to the invention can be installed in a construction.

FIG. 25 shows three examples of how a construction damper 1 according to the invention can be installed in a construction. Here, FIG. 25a shows a construction with a truss beam 25 to which the construction damper 1 is attached. Furthermore, the construction has two vertical supports 26 on which a ceiling disc 27 rests. If an earthquake occurs, normal forces are generated in the truss beam 25 due to the movements of the ground imposed on the construction. These are damped by the construction damper 1.

Figure 25B:
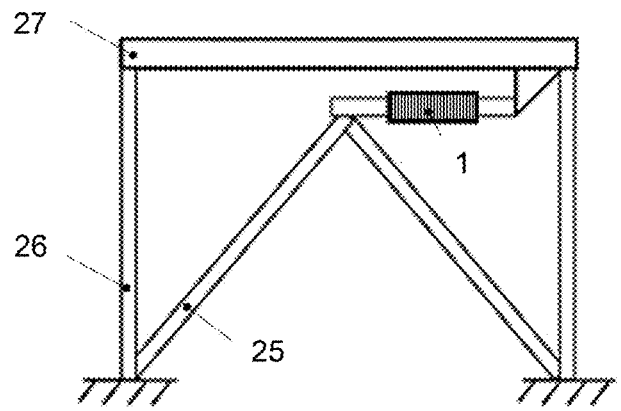
FIG. 25b a second example of how a construction damper according to the invention can be installed in a construction.

FIG. 25b shows a second example of how a construction damper according to the invention can be installed in a construction. Here, the construction damper 1 is fixed like a truss rod between a node of two truss beams 25 and the ceiling disc 27. Here, too, only normal forces are introduced into the construction damper.

Figure 25C:
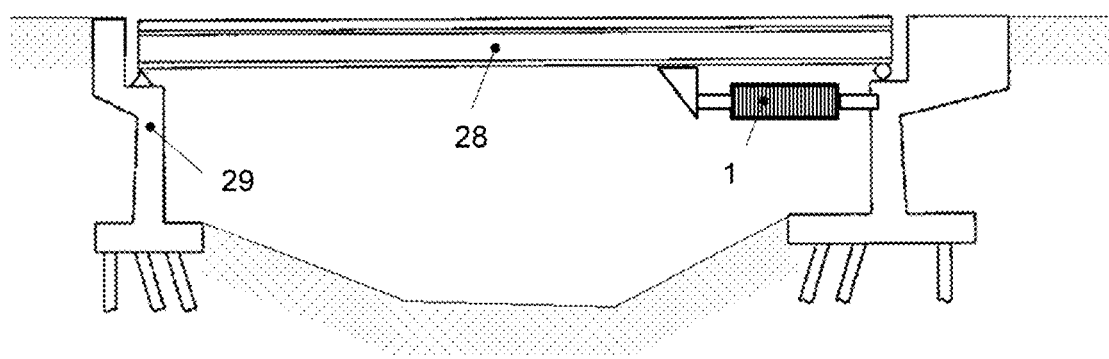
FIG. 25c a third example of how a construction damper according to the invention can be installed in a construction.

FIG. 25c shows a third example of how a construction damper 1 according to the invention can be installed in a construction. In this case, the construction is a bridge in which the construction damper 1 is fastened between the bridge deck 28 and an counter bearing 29. Here, too, the mounting is carried out in such a way that only normal forces are introduced into the construction damper 1.

REFERENCE NUMERALS 1. construction damper
2. steel beam
3. mortar
4. sheathing tube
5. thrust damping part
6. first longitudinal beam
7. transverse beam of first alignment
8. second longitudinal beam
9. transverse beam of second alignment
10. third longitudinal beam
11. transverse beam of third alignment
12. fourth longitudinal beam
13. transverse beam of fourth alignment
14. first force introduction means
15. traverse of the first force introduction means
16. bore of the first force introduction means
17. second force introduction means
18. traverse of the second force introduction means
19. bore of the first force introduction means
20. weld seam
21. connecting means
22. traverse of the connecting means
23. first web
24. second web
25. truss beam
26. support
27. ceiling disc
28. bridge deck
29. counter bearing

The invention claimed is:

1. A construction damper with at least one at least in regions ladder-like constructed thrust damping part which has at least two longitudinal beams which are connected to each other by at least two rung-like transverse beams which are aligned parallel to each other in a first alignment, wherein the rung-like transverse beams at their ends are each connected to the longitudinal beams in a bending-rigid manner, wherein
 the thrust damping part has a spatial structure, wherein at least two further rung-like transverse beams extending parallel to each other are arranged in a second alignment deviating from the first alignment, and
 the thrust damping part has at least one force introduction means,
 wherein the force introduction means is constructed as a u-shaped plate with two parallel legs, the legs of which laterally encompass the thrust damping part and at the outer leg ends of which a traverse connecting the two leg ends is arranged for closing the u-shaped recess.

2. The construction damper according to claim 1, wherein the thrust damping part has several transverse beam planes with at least one of the transverse beams arranged therein, wherein the transverse beam planes are arranged parallel spaced apart along the longitudinal axis of the thrust damping part.

3. The construction damper according to claim 2, wherein at least two of the transverse beams are arranged in each transverse beam plane, of which at least one transverse beam extends in a first alignment and one further transverse beam extends in a second alignment deviating from the first alignment.

4. The construction damper according to claim 2, wherein the several transverse beam planes are arranged at the same distance from each other along the longitudinal axis of the thrust damping part.

5. The construction damper according to claim 1, wherein at least two transverse beam planes each with at least two of such transverse beams arranged therein are provided in the thrust damping part.

6. The construction damper according to claim 1, wherein the thrust damping part is at least partly made of metal.

7. The construction damper according to claim 1, wherein at least one of the transverse beams has a beam height which increases towards both ends.

8. The construction damper according to claim 1, wherein the thrust damping part has a symmetrical, polygonal or round ground plan in plan view of its longitudinal axis.

9. The construction damper according to claim 1, wherein the thrust damping part has at least three of such longitudinal beams.

10. The construction damper according to claim 1, wherein the thrust damping part has a polygonal ground plan in plan view, in each of the corners of which one of such longitudinal beams is arranged.

11. The construction damper according to claim 1, wherein the longitudinal beams and the transverse beams of the thrust damping part are welded to each other.

12. The construction damper according to claim 1, wherein the thrust damping part has at least one elongated wall plate having several parallel slots extending transversely to the longitudinal axis of the wall plate.

13. The construction damper according to claim 1, wherein the thrust damping part has several multiple-slotted wall plates arranged at an angle to each other in plan view of its longitudinal axis.

14. The construction damper according to claim 1, wherein the thrust damping part has a tube, and wherein in at least one tube wall several parallel slots extending transversely to the longitudinal axis of the tube are arranged and constructed in such a way that in the longitudinal direction of the tube there are at least two continuous wall sections which form the longitudinal beams of the thrust damping part, while the wall sections extending transversely to the longitudinal axis of the tube between the slots form the rung-like transverse beams.

15. The construction damper according to claim 14, wherein the tube wall is at least partially flat or curved.

16. The construction damper according to claim 14, wherein the tube has a round or polygonal cross-section in plan view of its longitudinal axis.

17. The construction damper according to claim 1, wherein the thrust damping part has at least one clasp-like constructed force introduction means.

18. The construction damper according to claim 1, wherein the force introduction means connects two non-adjacent longitudinal beams of the thrust damping part.

19. The construction damper according to claim 1, wherein the force introduction means is attached to two non-adjacent longitudinal beams.

20. The construction damper according to claim 1, wherein the force introduction means has a fastening means for fastening the construction damper to a construction.

21. The construction damper according to claim 1, comprising several thrust damping parts, wherein at least two of the thrust damping parts are connected to each other by means of at least one connecting means.

22. The construction damper according to claim 1, comprising several thrust damping parts, wherein at least one of the thrust damping parts has a damping effect which differs from the other thrust damping part(s).

23. The construction damper according to claim 1, comprising several thrust damping parts, wherein at least two differently rigid thrust damping parts are connected to each other in such a way that in case of a small earthquake only the less rigid thrust damping part is activated and in case of a large earthquake both the more rigid and the less rigid thrust damping part are activated.

24. The construction damper according to claim 1, comprising several thrust damping parts, wherein at least two differently rigid thrust damping parts are connected to each other in such a way that in case of a small earthquake only the less rigid thrust damping part is activated and in case of a large earthquake only the more rigid thrust damping part is activated.

25. The construction damper according to claim 22, wherein the connecting means has a locking system for limiting or suppressing movements of at least one of the thrust damping parts arranged therein.

26. The construction damper according to claim 22, wherein the connecting means has two u-shaped recesses, the legs of which each laterally encompass one of the thrust damping parts and at each of the leg ends of which there is arranged a traverse connecting the two outer leg ends.

27. The construction damper according to claim 1, wherein at least one longitudinal side of one of the longitudinal beams of the thrust damping part is welded longitudinally to at least one of the legs of the force introduction means.

28. The construction damper according to claim 1, wherein at least two transverse beam planes each with four of such transverse beams arranged therein are provided in the thrust damping part.

29. The construction damper according to claim 1, wherein the thrust damping part is at least partly made of steel.

30. The construction damper according to claim 1, wherein all transverse beams have a beam height which increases towards both ends.

31. The construction damper according to claim 1, wherein the thrust damping part has four of such longitudinal beams.

32. The construction damper according to claim 1, wherein the force introduction means has a bore for fastening the construction damper to a construction, and wherein the bore is arranged on the side of the force introduction means opposite the traverse.

33. The construction damper according to claim 1, comprising several thrust damping parts, wherein at least one of the thrust damping parts has a damping effect which differs from the other thrust damping part(s) because it has a different number of transverse beams.

34. The construction damper according to claim 1, wherein at least one longitudinal side of one of the longitudinal beams of the thrust damping part is welded longitudinally to at least one of the legs of the connect means.

* * * * *

UNITED STATES PATENT AND TRADEMARK OFFICE
CERTIFICATE OF CORRECTION

PATENT NO. : 12,054,940 B2
APPLICATION NO. : 17/424829
DATED : August 6, 2024
INVENTOR(S) : Emanuele Gandelli and Johann Distl Page 1 of 1

It is certified that error appears in the above-identified patent and that said Letters Patent is hereby corrected as shown below:

In the Claims

Claim 25, Line 32: "claim 22" should be replaced with --claim 21--

Claim 26, Line 36: "claim 22" should be replaced with --claim 21--

Signed and Sealed this
Twenty-fourth Day of June, 2025

Coke Morgan Stewart
*Acting Director of the United States Patent and Trademark Office*